(12) United States Patent
Glasson

(10) Patent No.: US 7,609,055 B2
(45) Date of Patent: Oct. 27, 2009

(54) POSITION SENSING DEVICE AND METHOD

(75) Inventor: Richard O. Glasson, Whippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 764 days.

(21) Appl. No.: 10/896,335

(22) Filed: Jul. 21, 2004

(65) Prior Publication Data

US 2006/0017431 A1    Jan. 26, 2006

(51) Int. Cl.
*G01B 7/14* (2006.01)

(52) U.S. Cl. ............................ 324/207.24; 324/207.13; 324/207.2

(58) Field of Classification Search ............ 324/207.24, 324/207.13, 207.2
See application file for complete search history.

(56) References Cited

U.S. PATENT DOCUMENTS

| | | |
|---|---|---|
| 2,498,799 A | 2/1950 | Erickson |
| 3,403,365 A | 9/1968 | Richards |
| 3,777,273 A | 12/1973 | Baba et al. |
| 3,988,710 A | 10/1976 | Sidor et al. |
| 4,005,396 A | 1/1977 | Fujiwara et al. |
| 4,057,904 A | 11/1977 | Vrable et al. |
| 4,121,504 A | 10/1978 | Nowak |
| 4,214,180 A | 7/1980 | Kuwako et al. |
| 4,231,700 A | 11/1980 | Studebaker |
| 4,286,386 A | 9/1981 | Long |
| 4,288,196 A | 9/1981 | Sutton, II |
| 4,319,864 A | 3/1982 | Kaufeldt |
| 4,342,884 A | 8/1982 | Ban et al. |
| 4,356,557 A | 10/1982 | Bell et al. |
| 4,367,998 A | 1/1983 | Causer |
| 4,386,552 A | 6/1983 | Foxwell |
| 4,413,245 A | 11/1983 | Bartholomaus et al. |
| 4,425,557 A | 1/1984 | Nakamura |
| 4,480,151 A | 10/1984 | Dozier |
| 4,488,014 A | 12/1984 | Daniel et al. |
| 4,497,375 A | 2/1985 | Mucheyer et al. |
| 4,653,190 A | 3/1987 | Spain, Jr. |
| 4,737,698 A | 4/1988 | McMullin et al. |
| 4,914,389 A | 4/1990 | Juds |
| 4,945,221 A | 7/1990 | Nielsen et al. |
| 4,989,329 A | 2/1991 | Pullen |
| 4,999,579 A | 3/1991 | Winfried |
| 5,024,250 A | 6/1991 | Nakamura |

(Continued)

FOREIGN PATENT DOCUMENTS

DE    2635614 A    2/1978

(Continued)

OTHER PUBLICATIONS

Patent Abstract of JP 11211410 Jitosho, Aug. 6, 1999.

(Continued)

*Primary Examiner*—Reena Aurora

(57) ABSTRACT

A field-altering device for an inductive sensor has an elongated body with a substantially saw-tooth profile. The body is made of steel or other type ferrous material. With use in a Hall-effect sensor, the body moves relative to the sensor causing the field to vary periodically with time. The sensor generates an electrical signal in dependence on the field variations, the electrical signal having a saw-tooth pattern.

13 Claims, 2 Drawing Sheets

U.S. PATENT DOCUMENTS

| | | | |
|---|---|---|---|
| 5,046,243 A | 9/1991 | Walker |
| 5,156,242 A | 10/1992 | Ditzig |
| 5,200,747 A | 4/1993 | Betz et al. |
| 5,203,723 A | 4/1993 | Ritter |
| 5,233,293 A | 8/1993 | Huang et al. |
| 5,341,724 A | 8/1994 | Vatel |
| 5,364,043 A | 11/1994 | Linderoth |
| 5,389,876 A | 2/1995 | Hedengren et al. |
| 5,404,661 A | 4/1995 | Sahm et al. |
| 5,444,369 A | 8/1995 | Luetzow |
| 5,467,938 A | 11/1995 | Redman |
| 5,659,248 A | 8/1997 | Hedengren et al. |
| 5,681,006 A | 10/1997 | Herd et al. |
| 5,693,935 A | 12/1997 | Hassler, Jr. et al. |
| 5,694,042 A | 12/1997 | Eaton et al. |
| 5,701,793 A | 12/1997 | Gardner et al. |
| 5,752,811 A | 5/1998 | Petro |
| 5,757,179 A | 5/1998 | McCurley et al. |
| 5,768,946 A | 6/1998 | Fromer et al. |
| 5,789,917 A | 8/1998 | Oudet et al. |
| 5,841,274 A | 11/1998 | Masreliez et al. |
| 5,894,678 A | 4/1999 | Masreliez et al. |
| 5,901,458 A | 5/1999 | Andermo |
| 5,936,399 A | 8/1999 | Andermo et al. |
| 5,955,881 A | 9/1999 | White et al. |
| 5,973,494 A | 10/1999 | Masreliez et al. |
| 6,160,395 A | 12/2000 | Goetz et al. |
| 6,220,158 B1 | 4/2001 | Hartmann et al. |
| 6,234,061 B1 | 5/2001 | Glasson |
| 6,246,232 B1 * | 6/2001 | Okumura | 324/207.2 |
| 6,253,460 B1 * | 7/2001 | Schmitz | 33/706 |
| 6,259,249 B1 | 7/2001 | Miyata et al. |
| 6,279,248 B1 | 8/2001 | Walters |
| 6,335,618 B1 | 1/2002 | Nahum |
| 6,353,314 B1 | 3/2002 | Moerbe |
| 6,360,449 B1 | 3/2002 | Steentjes |
| 6,381,863 B1 | 5/2002 | Steinich |
| 6,443,385 B1 | 9/2002 | Grandauer et al. |
| 6,450,048 B1 | 9/2002 | Samuelson et al. |
| 6,487,787 B1 | 12/2002 | Nahum et al. |
| 6,499,225 B1 | 12/2002 | Steinich |
| 6,501,264 B2 | 12/2002 | Shiraishi et al. |
| 6,522,129 B2 | 2/2003 | Miyata |
| 6,543,152 B1 | 4/2003 | Steinich |
| 6,545,461 B1 | 4/2003 | Miyata |
| 6,588,313 B2 | 7/2003 | Brown et al. |
| 6,611,138 B2 | 8/2003 | Vasiloiu |
| 6,636,035 B2 | 10/2003 | Kiriyama et al. |
| 6,646,434 B2 | 11/2003 | Miyata et al. |
| 6,669,135 B1 | 12/2003 | Hartley |
| 2003/0131724 A1 | 7/2003 | Neumann |
| 2004/0263159 A1 * | 12/2004 | Herbert et al. | 324/207.25 |

FOREIGN PATENT DOCUMENTS

| | | |
|---|---|---|
| DE | 3835782 A | 4/1990 |
| DE | 4038674 A1 | 6/1992 |
| DE | 19814758 A1 | 10/1999 |
| DE | 19908036 | 8/2000 |
| DE | 20015895 U1 | 12/2000 |
| EP | 0325787 B | 8/1989 |
| EP | 0505297 A | 9/1992 |
| EP | 0896855 A | 2/1999 |
| FR | 2794236 | 12/2000 |
| JP | 11211410 | 8/1999 |
| WO | WO-9955613 | 11/1999 |

OTHER PUBLICATIONS

Applied Technologies Group, *Part Design for Ultrasonic Welding*, Branson, Nov. 1999.

Applied Technologies Group, *Ultrasonic Staking, Branson*, Nov. 1999.

Murakami, Taku, *Precision Angle Sensor Unit for Construction Machinery*, International Off-Highway & Powerplant Congress & Exposition, Sep. 8-10, 1997.

PCT Notification for PCT/US2005/026306 dated Dec. 2, 2005.

International Search Report and Written Opinion for PCT/US2005/026306 dated Dec. 2, 2005.

* cited by examiner

FIG. 1
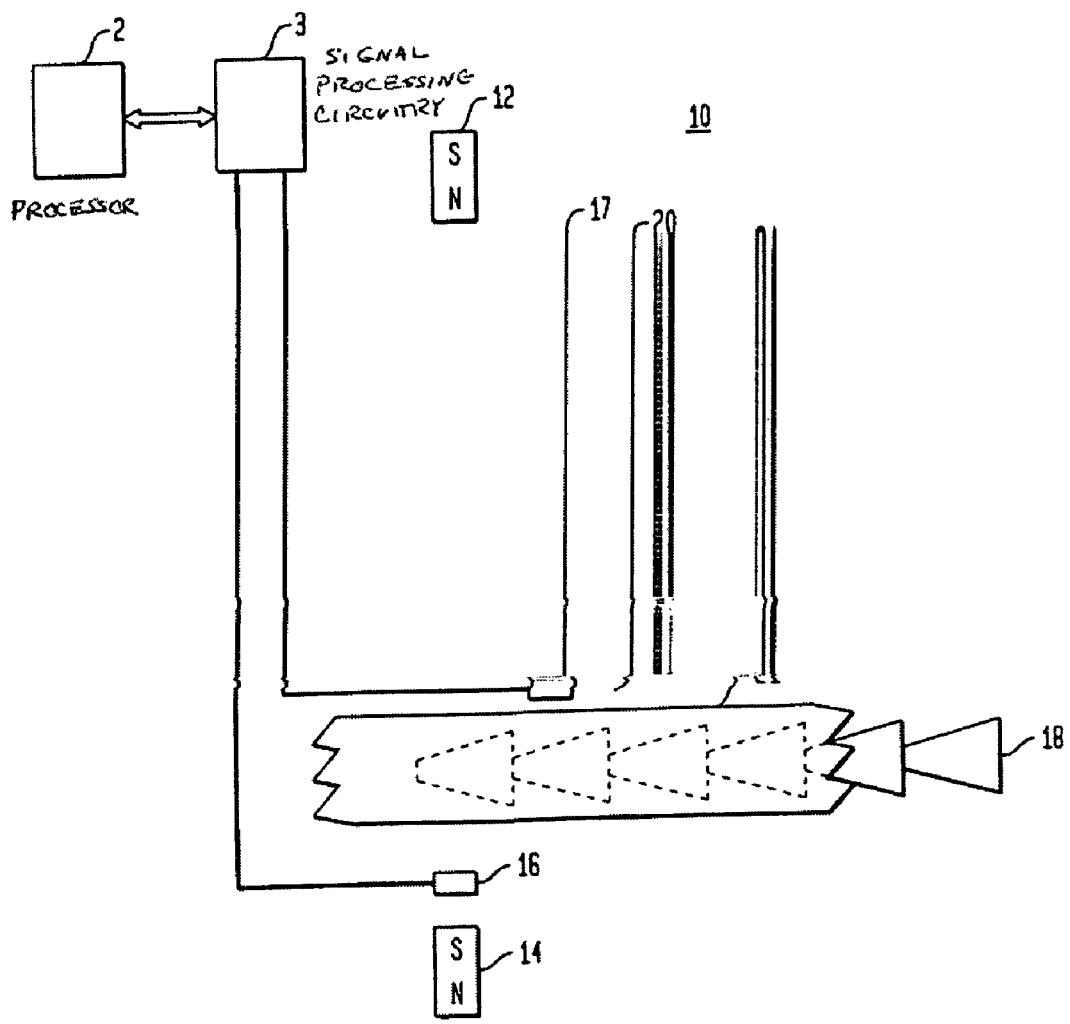
FIG. 2A
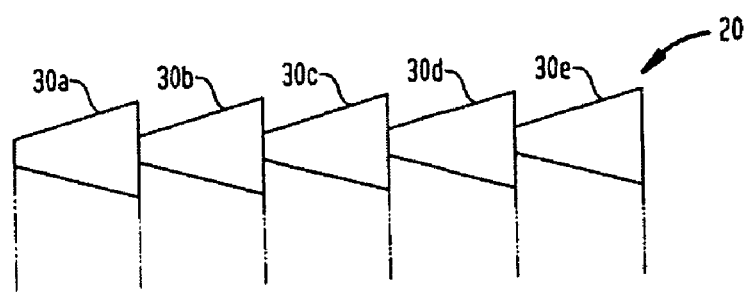
FIG. 2B

POSITION SENSING DEVICE AND METHOD

FIELD OF THE INVENTION

The invention relates to sensors, and more particularly to inductive sensors using field altering bodies.

BACKGROUND

Patent Application No. 2003/1031724A1, entitled "Cylinder With Optical Position Sensing Device And Method," is directed to a fluid-pressure actuated piston/cylinder assembly having an optical sensor capable of reading indicia markings on a piston rod. The publication discloses various ways for providing optically readable scales upon a piston rod. Other coding scales are also disclosed, such as a bar code for determining the position of a movable member. Several methods for marking a rod with a scale are disclosed, including the use of a laser to create discolorations in a rod.

Sensing systems utilizing optical marks with an optical pickup present various problems. For example, the ability of an optical sensing head to read indicia depends upon the clarity of such indicia. In hostile environments, such as the environments typical for fluid actuated cylinders, the indicia marks are exposed to the environment, and consequently, are prone to degradation. Additionally, the piston rod requires specialized fabrication techniques for imparting the indicia on the rods, and a specialized sealing arrangement must be used for the optical sensing head.

Furthermore, an optical sensor solution relying upon quadrature measuring techniques has the same limitation as various inductive devices utilizing quadrature measuring techniques. Such inductive measuring devices rely upon a ferrous target having square ridges or teeth and a quadrature scheme for measuring relative position of the target with respect to a fixed sensing head. Resolution is therefore limited by the distances between the increments. In an optical system, resolution is limited by the distance between indicia marks. In many applications, higher resolution is required.

SUMMARY

A sensing device according to the principles of the invention includes an inductive sensor head and a body moveable relative to the sensor. The body is made of a material capable of altering a magnetic field and has a substantially out of square profile in a direction of relative travel between the body and the inductive sensor. In one embodiment, the sensor uses one or more Hall-effect sensors, and the body moves in dependence with an object to be sensed. As the body moves relative to the Hall-effect sensors, the signal output of the sensor alters in accordance with the profile of the body.

In one exemplary sensor arrangement, the body includes at least one, and preferably a plurality, of conical sections which appear as saw-tooth in profile when viewed from a side. A magnetic field is disposed to the body and to the sensors. The rod's travel relative to the sensor causes a variation in the magnitude of the magnetic field such that the field has a saw-tooth profile when plotted against time. In other embodiments, other profiles can be generated.

Sensors according to the principles of the invention have application to, for example, pneumatic or hydraulic cylinders. The body is enclosed in a piston rod fabricated to accommodate the body, and the enclosure is magnetically permeable or transparent. In the mechanical respect, the rod and body can function as an ordinary piston rod. The body, however, acts on the magnetic field of the sensing head sensors. In one embodiment, Hall-effect sensors are disposed such that the sensed magnetic field is altered by the rod travel. The body can have a saw-tooth profile, or other profiles, such as square waves or sinusoids, can be generated.

BRIEF DESCRIPTION OF THE DRAWINGS

In the figures:

FIG. 1 shows a measuring device according to the principles of the invention;

FIG. 2A shows an exemplary target body according to the principles of the invention;

FIG. 2B shows an exemplary voltage-position plot in correspondence to the target body of FIG. 2A;

DETAILED DESCRIPTION

Figure 3:
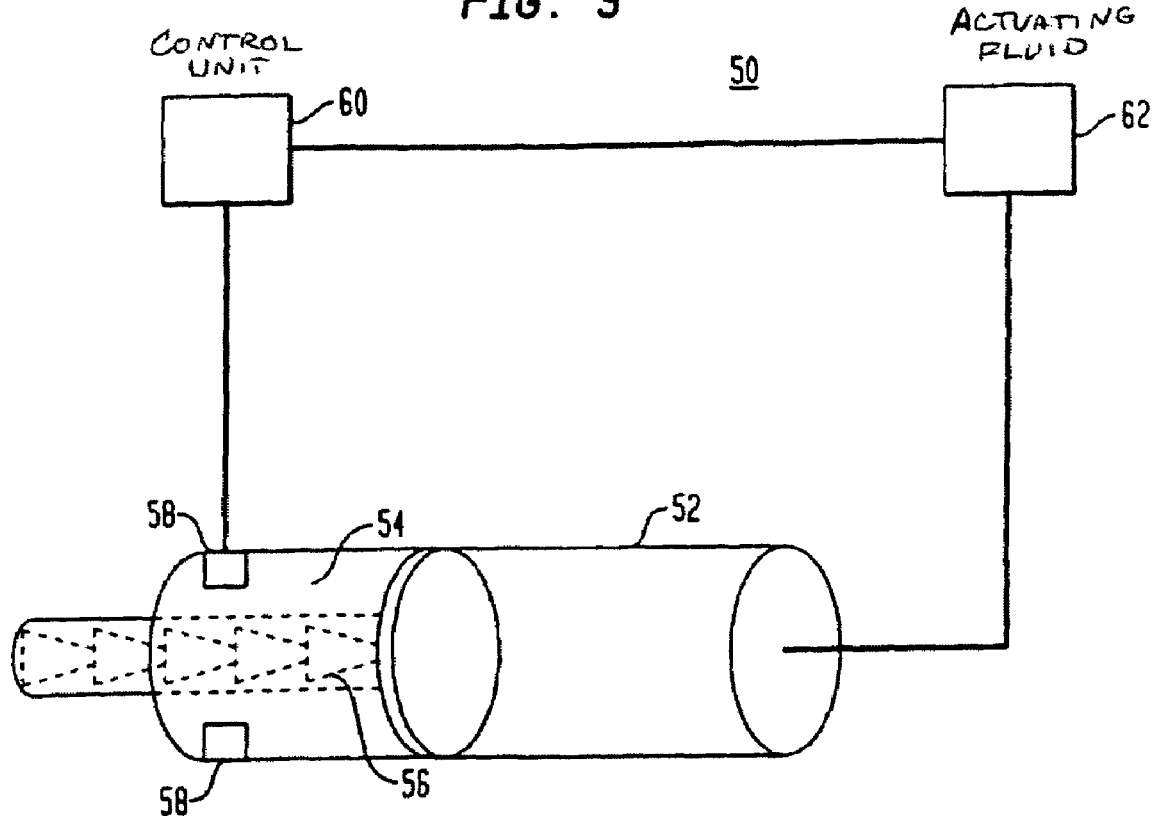
FIG. 3 shows an exemplary actuated cylinder feedback system.

FIG. 1 discloses a sensing system 10 according to the principles of the invention. The sensing system 10 includes a rod 20. The rod 20 includes a target body 18 having a specifically shaped outer profile and, optionally, a rod envelope 21 enclosing the target body 18. The sensing system further includes two magnets 12 and 14 arranged in a push-pull configuration and two inductive sensor elements 16 and 17 disposed to sense the target rod 18. The outputs of the sensor elements 16 and 17 are operatively connected to conditioning and/or processing circuitry 3 which interfaces with a processor 2. The magnets 12 and 14 are arranged to form a magnetic field that encompasses both the sensors 16 and 17 and the target body 18. The target body 18 is made of a ferrous material which will influence the magnetic field encompassing the sensors and the target rod. The optional envelope or tube 21 is made of a magnetically permeable or magnetically transparent material.

The rod may be formed of a carbon steel alloy that is magnetic, such as common "12L14" steel. The profile may be formed by a turning operation, or by cold-forming on a roller. The tube into which the target rod is inserted is formed of a material that is non-magnetic, or has a reasonable degree of magnetic permeability such as "300" series stainless steels. The tube provides a protective case for the target rod and facilitates the use of linear motion components in the construction of a linear sensing system. The sensing head which includes the inductive sensors, and, optionally, magnets and circuitry 3 are placed close to the outside of the tube. The sensing head may be mounted anywhere along the rod and tube assembly, and at any azimuth with respect to the linear measurement axis. The rod and tube assembly, or the sensing head, may be affixed to the elements to be sensed.

With respect to deployment of the magnetic field, other configurations, such as pull through or back biased, can be used to create the magnetic field. All that is required is a magnetic field that can be influenced by the target body 18. The sensors 16 and 17 may be any sensors that can sense the deviation of a magnetic field, and in this example are Hall-effect sensors. Although two sensors are shown in the example of FIG. 1, any number of sensors can be employed. The decode and processing circuitry 3 conditions the outputs for interfacing with the processor 2, which can act upon the outputs as may be desired for a particular application.

Exemplary operation is like this. The rod 20 travels in relation to the sensors 16 and 17. As the target body 18 moves through the magnetic field with reference to the sensors, the in-field cross-section of the target body varies in accordance with the outer profile of the body 18. The magnetic field varies according to the influence of the target body 18 upon the magnetic field. These variations are sensed by the sensing head and are the basis of the measurand. Because the target profile is known, a particular change in signal relates to a particular linear distance traveled by that profile, and hence the target body. In turn, the sensors provide an output in correspondence with the magnetic field. The output can be a voltage or current.

FIG. 2A shows a target body 20 having conical sections 30(a-e) according to the principles of the invention. FIG. 2B, a voltage-position plot, is shown in correspondence to the target body 20 of FIG. 2A. As the target body 20 moves through a magnetic field (not shown), inductive sensors (not shown) disposed to sense the magnetic field output a voltage having the profile shown in the voltage-position plot 22. Each interval of the profile includes a substantially linear section 24(a-e), corresponding to the upward sloping portions of the conical sections of the target body. As the target body travels relative to the sensors and the magnetic field, the sensors sense the variation in the magnetic field and output a substantially linear voltage which is indicative of the position of the rod. In the linear sections 24(a-e), the voltage signal is continuous, or analog, allowing for resolution unconstrained by the distances between increments as in quadrature techniques.

Referring again to FIG. 1, the two sensors 16 and 17 are offset relative to each other such that each is providing an output relative to a different section of the target rod. In this instance, the sensors are disposed to sense adjacent sections, and have their leading edges placed a distance apart approximately equal to the distance between a leading and falling edge of a section. Other arrangements can be provided, as applications may dictate. In this two sensor arrangement, the processor 2 controls which sensor output to use for the position signal. As one sensor nears the wide end of a conical section, the other sensor will be entering the narrow end of the conical section of the segment. The linear sensing chore is "handed off" to the entering sensor. The sensor that was performing linear sensing is now used to sense the passage of the end of the conical segment. The passage of an end increments a count or decrements a count. This cycle alternates continuously as the target segments pass by the sensor pair.

As multiple segments pass, the sensors alternately sense the linear distance of passing sections. The signal processing circuitry 3 and processor 2 alternately select the appropriate sensor for linear sensing, or segment transition sensing, as the target body passes. In this way, the individual linear segment measurements are "strung together" to form a long linear measurement of arbitrary length. Whether a segment is added or subtracted is determined by the direction of travel, which, in turn, can be determined by the sign of the slope of the measurand profile at any point along the traveling rod. In other words, as the slope is rising, the rod is traveling in one direction. If the slope is falling, the travel is in the opposite direction.

To maintain limits on the diameter of the rod, multiple repeating profiles are employed. In this exemplary embodiment, the linear range of the sensing system may be configured for any length with the use of an appropriate number of target sections. The segments may employ a reference, or homing indicia. The system outputs can be conditioned for the practical requirements of the intended application, and outputs can take any form (voltage, current, analog, digital, etc.) as applications may dictate. The processor 2 can be an ordinary microprocessor, microcontroller, application specific integrated circuit, discrete logic or any combination of hardware, software or firmware that can carry out instructions. In the exemplary embodiment of FIG. 1, the processor 2 can send and receive signals via the decode and conditioning circuitry 3, which circuitry 3 can be made part of the processor or can be provided on-board the sensing head. The processor 2 can also provide signals to other components (not shown) which may form part of a larger control system. The processor 2 can carry out instructions which when executed cause the system 10 to perform one, more or any combination of the following functions: Initialization, Sensor Assign, Sensor Hand-off, Determine Rod Position, and Calibration. It is understood that the system 10 includes memory which may be required by the processor to carry out its functions.

The Initialization function takes place during start-up of the system 10. Start-up can be the result of a transition from power-off to power-on, or can be resumption of rod travel after an idle period, or any state for which it would be beneficial to either "home" the device or determine a current position. At a transition from power-off to power-on, or after an idle period, the system 10 initializes to a reference position to which subsequent increments or decrements are added. The processor 2 can cause the device to zero by putting the rod in a home position corresponding to zero travel. Alternatively, the processor 2 can access data relative to the last known position of the rod and the rod's direction of travel and use this data as the starting point for subsequent measurement.

The functions of Sensor Assign and Sensor Hand-off refer to the assignation of the particular sensor element function in a multiple sensor element system such as in FIG. 1. In this configuration, one sensor provides the voltage output relative to the linear section of a particular profile section. The other sensor is assigned to determine transitions. The processor 2 selects the sensor output for each function, and determines when to alternate the selection. At initialization, the processor assigns the initial functions. During active rod movement, hand-off occurs based upon, for example, the transition of the linear section into, or out of, a particular sensing element's sensing range. This can be determined by simply monitoring for a voltage which would indicate the end or beginning of a linear section for either, or both, of the sensors.

The function of Determine Rod Position includes the subfunctions of calculating sectional distance, counting, and multiplication of counted segments. Calculating sectional distance refers to determining the rod position within a particular linear segment, and this value can be calculated by relating the known length of the segment to the voltage output of the appropriate sensor, i.e., there is a correspondence between output voltage and position. This value can be determined by multiplying a value derivative of the voltage representing a height along the slope by the inverse of the slope value of the segment. Alternatively, a look-up table can be maintained and updated relating voltage outputs to distances. Counting refers to incrementing or decrementing a count in dependence upon direction of travel. Direction can be determined by slope value, as previously explained. Thus, position is determined by multiplying the count by the known length of the segments and adding the calculated sectional distance.

Calibration refers to the function of offsetting the change in the "magnetic circuit" due to time, temperature, or outside influences. The length of each segment is predetermined during design and manufacture, therefore it is known that a determined distance has passed every time the transition occurs between segments. The sensing system relies upon a pre-calibrated slope value to determine the linear distance traveled for a given measurand signal within a given target segment. Changes in the magnetic circuit may, as described above, require changes in the sensor slope value to maintain a desired level of accuracy. The slope value may be checked when there is a transition from one target segment to the next. When a complete segment has been passed, the expected (known) value of the segment may be compared to the measured value. If the measured value differs from the known value the signal processing elements 2 and 3 of the system may update the slope value to be used in the next successive segment. Additionally, since the scale of such errors would likely be relatively small, this system may perform running corrections with the passage of each segment, adding or subtracting minute amounts when a segment is passed, thus maintaining a high degree of absolute accuracy over arbitrarily long translations.

The system 10 would provide a robust linear position sensing system that is resistant to wash down, dirt, shock, and other industrial environments. The sensing head can contain no moving parts and may be encapsulated. The rod and tube assemblies for such a system may be mass-produced in sections. Systems of this type may be scaled to fit particular applications. On very large machinery the rod and tube assemblies might be appropriately large, and conversely for small systems.

The system 10 may also relieve the manufacturing process of the requirement for very high precision in the production of system components. The requirement for precision is confined, in the exemplary case of a saw-tooth, to the small area of the conic profile for a given segment, and more precisely as only a requirement regarding the segment length, an easy parameter to achieve in automated production systems. Long-range accuracy is a function of maintaining uniform spacing between segments. Errors in any given segment are compartmentalized, and are not propagated or piston-cylinder 52 includes through the larger system.

Referring now to FIG. 3, there is shown a piston-cylinder assembly with feedback 50 according to the principles of the invention. The piston-cylinder 52 includes a piston rod 54 having a target rod 56. Sensing heads 58 include a magnet and preferably a Hall-effect sensor. The outputs of the sensing head are fed to a control unit 60 which controls the actuating fluid 62. The piston translates via the action of the fluid 62. The sensing head may be disposed in or near the cylinder head end. The passage of the rod and tube as the cylinder piston moves in and out provides precise linear position measurements of piston position. These position signals are useful for a wide range of control functions on machinery using fluid power cylinders. In this respect, it can be seen that a feedback control system for an actuated cylinder according to the principles of the invention provides a linear sensing signal 58 in accordance with the outputs of the conical section profile.

Another exemplary embodiment includes a target rod, a tube, into which the target rod is inserted, a sensing head and linear motion components, such as linear bearings, supports, and slides which comprise a linear motion system with integral position sensing.

The above described stainless steel tubing with embedded target rod may be used as sliding elements in a machine system in place of ordinary steel guide rods. In this case the linear position sensing function would be added to many machines with little change in design or appearance. The system would provide double duty in the form of linear motion guide and linear position sensor.

Figure 4:
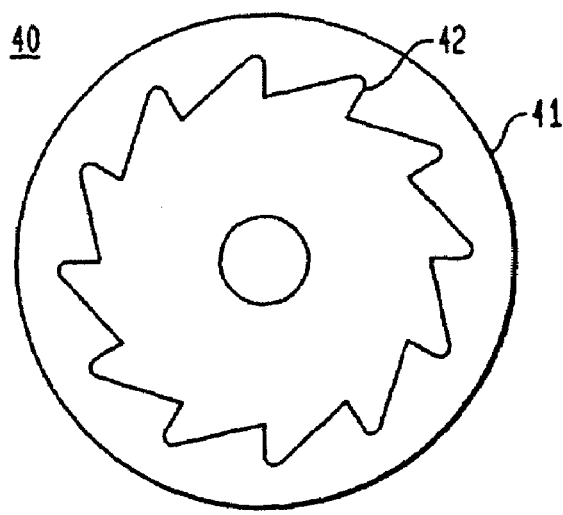
FIG. 4 shows a rotary sensor according to the principles of the invention.

The principles of the invention can be applied to a rotary sensor 40 as shown in FIG. 4. FIG. 4 displays the target 40 for such a rotary sensor. The target is made of ferrous material or any material that can operate on a field which when varied such variations can be sensed by a sensor. The field can be electromagnetic, magnetic or optical. The rotating sensor of this invention includes a profile 42 which will provide a saw tooth voltage output from a Hall-effect sensor when the target rotates through a magnetic field. Likewise, the rotating ferrous material can be enclosed within an envelope of magnetically transparent material 41.

The above described embodiments and functions are merely exemplary. The inventions can include additional embodiments of, for example, profile shape, material of manufacture, instructions, and the like. Further, the invention is not limited to the particular combinations of structure and function described herein, but includes the individual structures and functions, and sub-combinations thereof.

What is claimed is:

1. A sensing device comprising:
a first inductive sensor and a second inductive sensor;
a body moveable relative to said sensors, said body comprising a material capable of altering a magnetic field, wherein the sensors and the body are disposed in the magnetic field, the first and second inductive sensors being offset with respect to each other along the path of movement of the body, said body further having a conical surface profile capable of causing a time dependent variation to the magnetic field when said body moves relative to said sensors, wherein the body profile includes at least two substantially conical profiles disposed along an axial length of the body;
a substantially magnetically permeable envelope enclosing at least a portion of said body; and
processing circuitry responsive to outputs of the sensors.

2. A device in accordance with claim 1 wherein said inductive sensor is a magnetic effect sensor.

3. A device in accordance with claim 2 wherein said magnetic effect sensor is a Hall sensor.

4. A device in accordance with claim 1 further comprising at least one magnet disposed to provide said magnetic field wherein movement of the body relative to said sensors creates a time-varying magnetic field, said sensors operable to provide an output signal in dependence on said time-varying magnetic field.

5. A device in accordance with claim 1 further comprising at least another magnet, said at least one magnet and at least another magnet arranged in a push-pull configuration.

6. A device in accordance with claim 1 further comprising a processor responsive to signals from the at least one sensor, and instructions for instructing the processor to carry out steps in response to the signals.

7. A device in accordance with claim 1 wherein the magnetically permeable envelope is stainless steel.

8. A sensing device comprising:
at least one inductive sensor;
at least another inductive sensor; and
a body moveable relative to said sensors, said body comprised of a material capable of altering a magnetic field, said body further having a surface with a plurality of substantially saw tooth profiles in a direction of relative travel between said body and said inductive sensors, said device further comprising a processor responsive to signals from the at least one inductive sensor and the at least another inductive sensor, and instructions for instructing the processor to carry out steps in response to the signals, wherein the processor causes a sensing function to alternate between the at least one inductive sensor and the at least another inductive sensor.

9. A device in accordance with claim 8 wherein the at least one inductive sensor and the at least another inductive sensor are disposed in offset relation.

10. A device in accordance with claim 8 wherein said at least one inductive sensor is a magnetic effect sensor.

11. A device in accordance with claim 10 wherein said at least one magnetic effect sensor is a Hall sensor.

12. A device in accordance with claim 8 wherein said body comprises a ferrous material.

13. A device in accordance with claim 8 wherein said body is at least partially cylindrical in shape.

* * * * *